Nov. 3, 1970  R. A. CHEETHAM ET AL  3,538,362
DIODE-RECTIFIED ALTERNATING CURRENT GENERATOR HAVING
A BUILT-IN TRANSISTOR VOLTAGE REGULATOR
Filed Dec. 13, 1968  4 Sheets-Sheet 1

INVENTORS.
Robert A. Cheetham,
Arza D. Heiny,
Billy R. Jones, &
Robert W. Ward

C. R. Meland
ATTORNEY

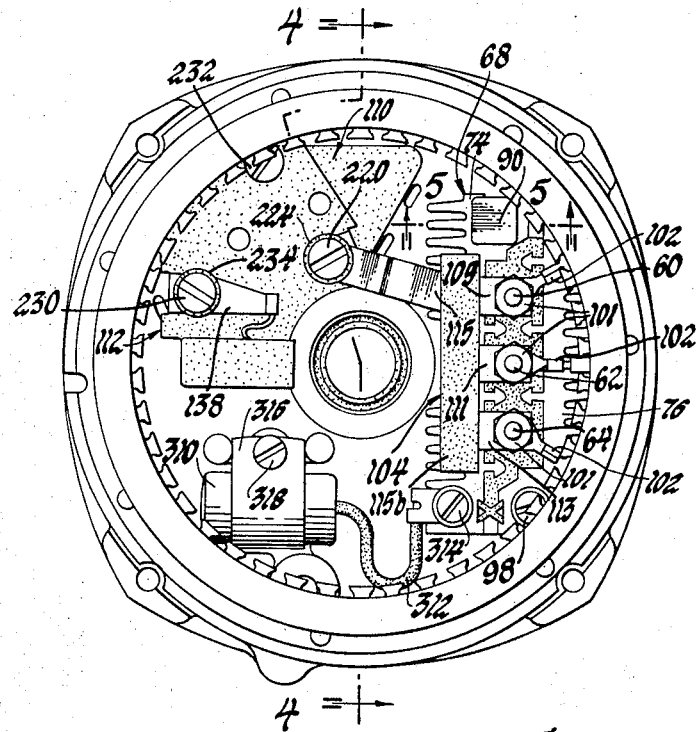
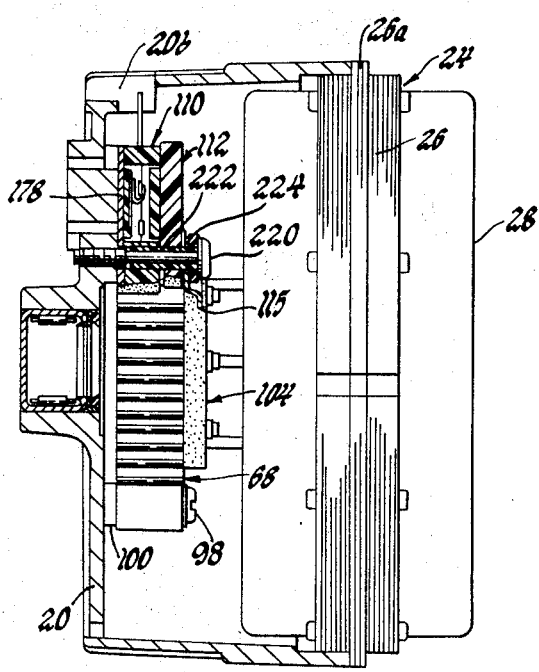
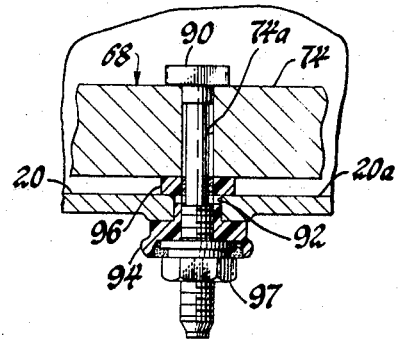

INVENTORS.
Robert A. Cheetham,
Arza D. Heiny,
Billy R. Jones, &
Robert W. Ward
BY
C. R. Meland
ATTORNEY INVENTORS.
Robert A. Cheetham,
Arza D. Heiny,
Billy R. Jones, &
Robert W. Ward
BY
C. R. Meland
ATTORNEY

United States Patent Office 3,538,362
Patented Nov. 3, 1970

3,538,362
DIODE-RECTIFIED ALTERNATING CURRENT GENERATOR HAVING A BUILT-IN TRANSISTOR VOLTAGE REGULATOR
Robert A. Cheetham, Anderson, Arza D. Heiny, Carmel, and Billy R. Jones and Robert W. Ward, Anderson, Ind., assignors to General Motors Corporation, Detroit, Mich., a corporation of Delaware
Filed Dec. 13, 1968, Ser. No. 783,523
Int. Cl. H02k 11/00
U.S. Cl. 310—68                                                                12 Claims

ABSTRACT OF THE DISCLOSURE

A diode-rectified alternating current generator is disclosed which has a semiconductor voltage regulator of the transistor type located within the end frame of the generator. The generator has a polyphase stator winding connected with a three-phase full-wave bridge rectifier unit that is mounted within the end frame of the generator. The end frame carries a transistor voltage regulator and a brushholder which are located within the end frame of the generator and which are secured in a stacked assembly to one inner wall of the end frame. The voltage regulator and brushholder have electrically conductive parts which engage each other when the brushholder and transistor regulator are fixed to the end frame for forming electrical connections between the field of the generator and the voltage regulator. A diode assembly is provided which consists of three diodes and three terminals of this assembly are mounted to terminal studs of the bridge rectifier unit and one terminal of the diode assembly is connected with the voltage regulator.

---

This invention relates to generators for supplying the electrical loads on a motor vehicle and more particularly to a diode-rectified alternating current generator which has a built-in bridge rectifier unit and a self-contained transistor voltage regulator for regulating the output voltage of the generator.

It is known in the art of motor vehicle generators to provide a single unit machine which includes built-in diodes for rectifying the output voltage of the generator and a built-in semiconductor voltage regulator. Such power supply units are illustrated in the U.S. patents to Raver 3,271,601 and to Newill et al. 3,299,303. In contrast to the diode-rectified alternating current generators shown in the above-identified patents, it is an object of this invention to provide a diode-rectified alternating current generator having a self-contained voltage regulator which is comprised of a plurality of separate components which are mounted to the frame of the generator and where a minimum amount of lead wires are utilized for connecting the various components of the generator. This provides for ease of assembly and also provides a system which is less liable to fail since the number of lead wires is greatly reduced as compared to known diode-rectified alternating current generators.

Another object of this invention is to provide a voltage regulating system for a diode-rectified alternating current generator where the field of the generator is energized through brushes carried by a brushholder and where the brushholder and a semiconductor voltage regulator are both mounted to one inner wall of the end frame of the generator by common fastener means such as screws. In carrying this object forward a semiconductor voltage regulator is provided which has a housing formed of insulating material. The voltage regulator has a plurality of face mounted conductors which engage terminal clips that are fitted to the brushholder. The terminal clips are connected with the brushes and these terminal clips are arranged to directly engage the face mounted conductors of the voltage regulator to electrically connect the brushes and certain parts of the voltage regulator when the voltage regulator and brushholder are secured to the end frame by the common fastener screws.

Still another object of this invention is to provide a diode-rectified alternating current generator where a polyphase bridge rectifier unit, a semiconductor voltage regulator and a brushholder are all mounted within one of the end frames of the generator and are disposed around the shaft of the rotor of the generator. This arrangement provides a compact unit but yet a unit which is readily assembled and less likely to fail in service due to the mounting features of this invention.

Figure 1:
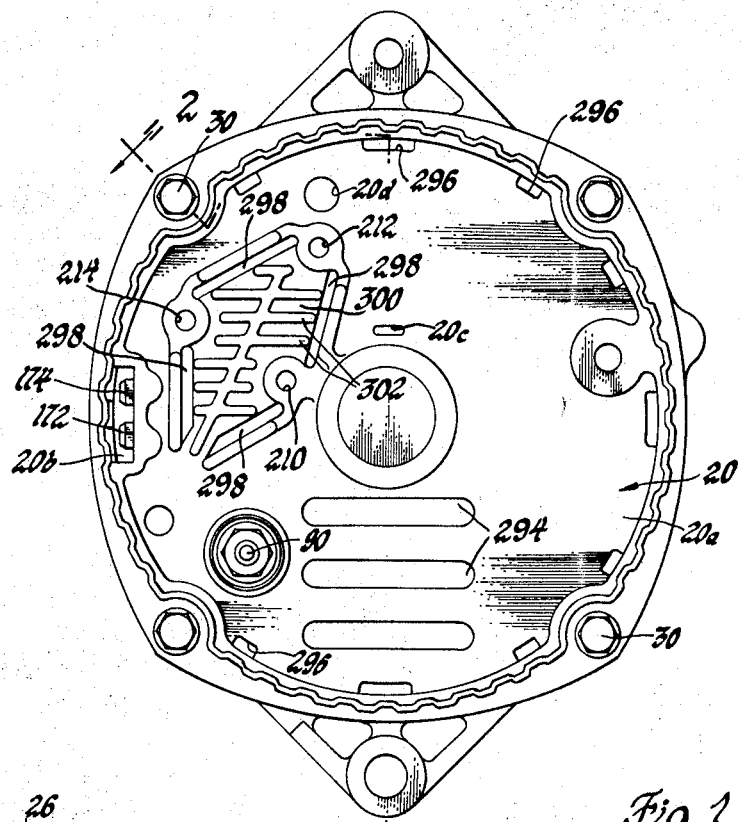
Figure 2:
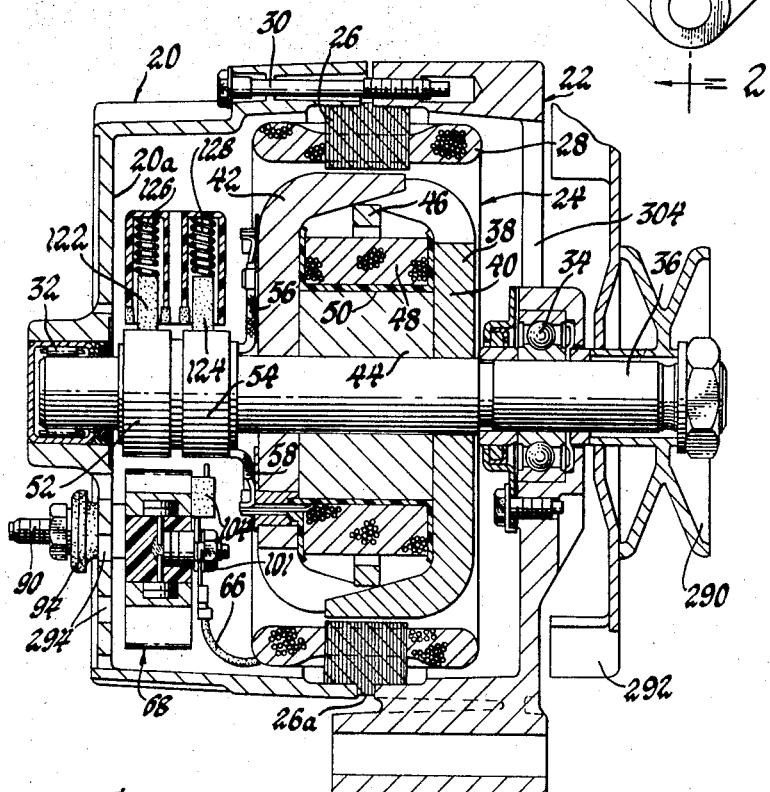
Figure 6:
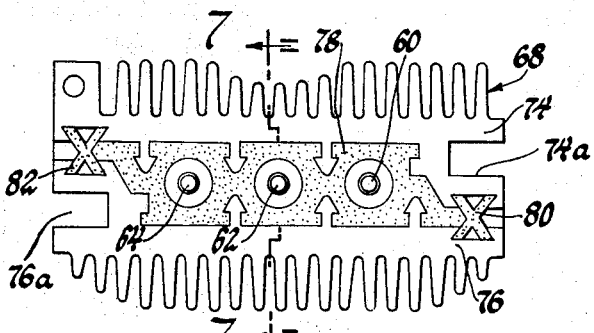
Figure 7:
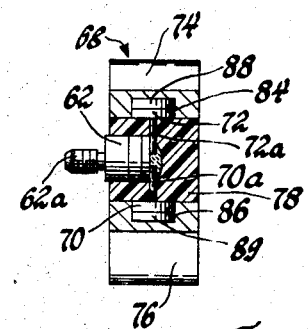
Figure 8:
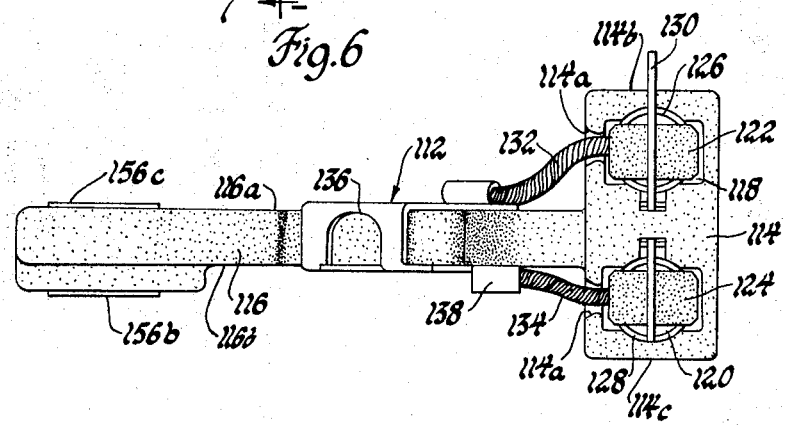
Figures 9, 11, 20:
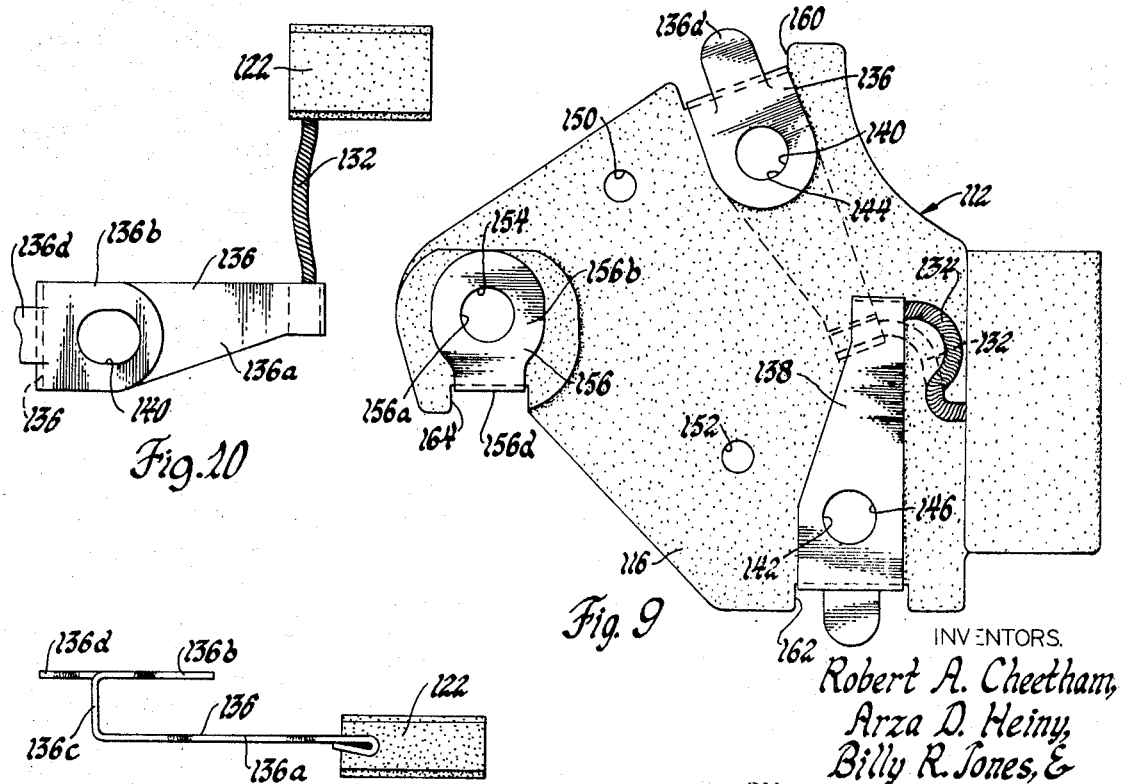
Figure 22:
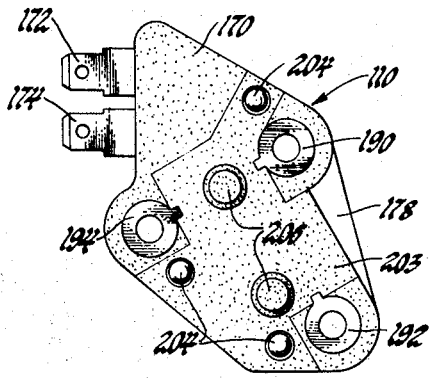
Figure 23:
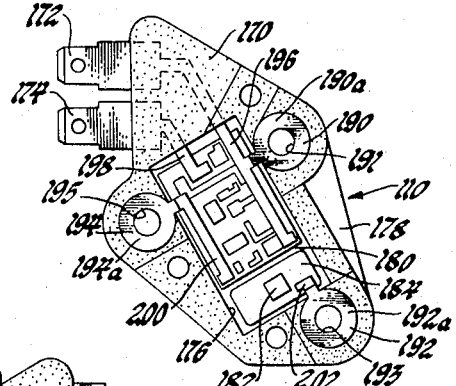
Figure 24:
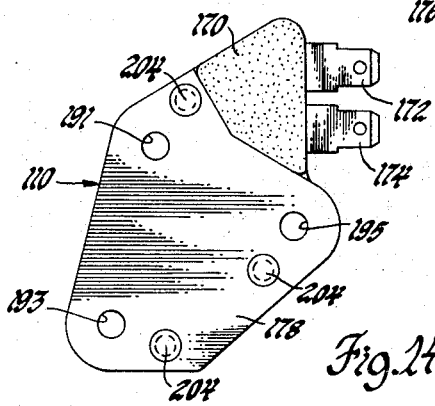
Figure 25:
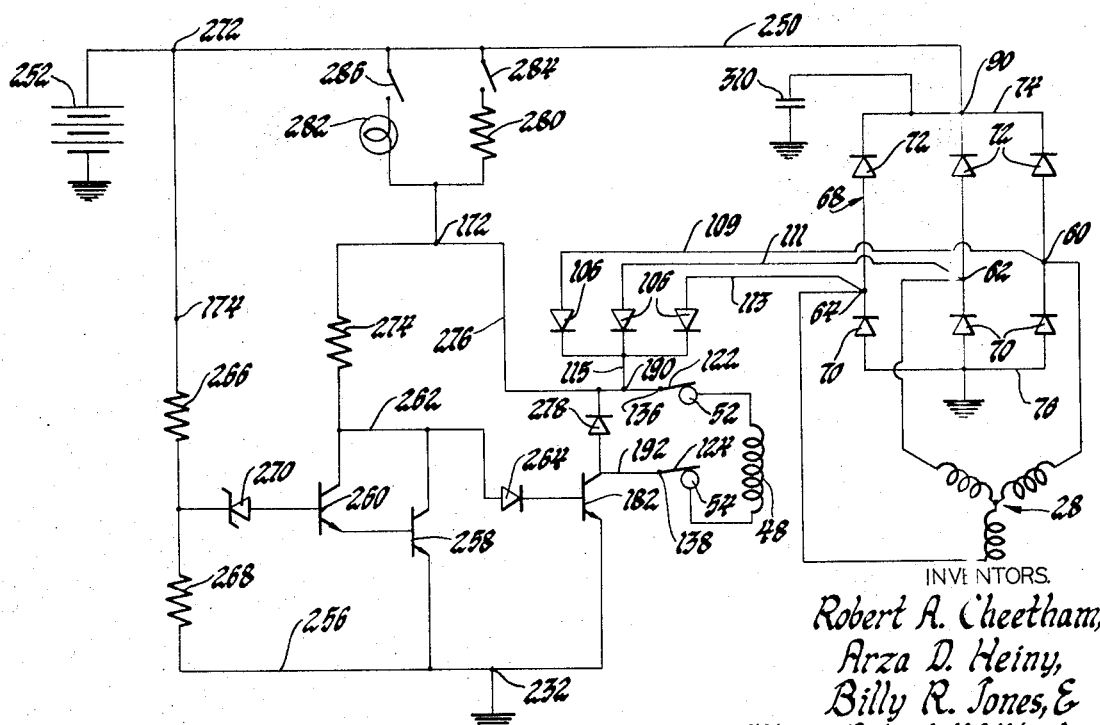

In the drawings:
FIG. 1 is an end view of a diode-rectified alternating current generator made in accordance with this invention;
FIG. 2 is a sectional view taken along line 2—2 of FIG. 1;
FIG. 3 is an end view of an end frame assembly which forms a part of the diode-rectified alternating current generator shown in FIGS. 1 and 2;
FIG. 4 is a view, partly in section, taken along line 4—4 of FIG. 3;
FIG. 5 is a sectional view taken along line 5—5 of FIG. 3;
FIG. 6 is an outline view of a bridge rectifier assembly utilized in the generator of this invention;
FIG. 7 is a sectional view taken along line 7—7 of FIG. 6;
FIG. 8 is an end view of a brushholder utilized in the generator of this invention;
FIG. 9 is a plan view of the brushholder shown in FIG. 8;
FIGS. 10 and 11 illustrate brush assemblies for use with the brushholder shown in FIGS. 8 and 9;
FIG. 12 is a plan view of a transistor voltage regulator used in the generator illustrated in FIGS. 1 and 2;
FIG. 13 is similar to FIG. 12 but illustrates the internal construction of the voltage regulator shown in FIG. 12;
FIG. 14 is a plan view of the opposite side of the voltage regulator from that illustrated in FIG. 12; and
FIG. 15 is a schematic circuit diagram of the diode-rectified alternating current generator shown in FIGS. 1 and 2 and shown electrically connected with other components in a motor vehicle electrical system.

Referring now to the drawings and more particularly to FIGS. 1 and 2, the reference numeral 20 has been used to generally designate one end frame of a diode-rectified alternating current generator of this invention. The generator has another end frame generally designated by reference numeral 22 and both of these end frames are formed of a metal material and preferably of cast aluminum. The end frames 20 and 22 support a stator assembly generally designated by reference numeral 24. The stator assembly 24 includes the usual magnetic core 26 formed of steel laminations which have slots that receive a conventional three phase Y-connected stator winding designated by reference numeral 28. Some of the laminations of the stator core 26 have a large diameter and these are designated by reference numeral 26a. These laminations are clamped between the end frames 20 and 22 when these frames are secured together by the thru bolts 30 which are threaded into end frame 22 as is clearly shown in FIG. 2.

The end frames 20 and 22 respectively carry bearings 32 and 34 which rotatably support a shaft 36 that forms a part of a rotor assembly generally designated by reference numeral 38. The rotor asembly 38, in addition to the shaft, carries pole members 40 and 42 and a core 44 formed of magnetic material. The pole members 40 and 42 have interleaved fingers and are of the type shown in the U.S. patent to Brown et al. 3,252,025. An aluminum ring 46 engages the inside of the pole teeth in a manner and for the purpose described in the above-mentioned U.S. Pat. 3,252,025. The rotor 38 further includes a field coil 48 which is wound on a spool 50 positioned about core 44 and between the pole members 40 and 42. The opposite ends of the field coil 48 are connected respectively with slip rings 52 and 54 which are suitably electrically insulated from each other and from the shaft 36. The connection between the field coil 48 and the slip rings is made by conductors 56 and 58 and can be made, for example, by the arrangement shown in the U.S. patent to Priddy 3,271,604.

The three phase Y-connected stator winding 28 is illustrated schematically in FIG. 15 and the phase windings of this Y-connected winding are electrically connected respectively with terminal studs 60, 62 and 64 by conductors 66. The terminal studs 60, 62, and 64 are supported by a bridge rectifier assembly generally designated by reference numeral 6 which includes silicon diodes 70 and 72. The bridge rectifier asembly 68 is illustrated in FIGS. 6 and 7 and includes a pair of finned aluminum heat sinks 74 and 76 having the configuration illustrated in FIG. 6 which are electrically insulated from each other by insulating material 78 and spacer blocks 80 and 82 which are formed of insulating material. In fabricating the bridge rectifier assembly 68 a pair of aluminum heat sinks 74 and 76 are provided which can be formed by extrusion and each of the heat sinks is provided with three bores. Thus, the heat sink 74 has three spaced bores 84 whereas the heat sink 76 has three spaced bores 86. Each bore 84 is provided with a copper disk 88 which in turn supports a silicon diode 72 connected with a terminal lead 72a. In a similar fashion each bore 86 of heat sink 76 contains an annular copper disk 89 and a silicon diode 70 connected with terminal lead 70a. The area around the leads and the ends of the diodes can be sealed with a silicon rubber composition which is not illustrated. It will be appreciated from an inspection of FIG. 15 that the heat sink 74 forms a positive direct current terminal for the bridge rectifier whereas the heat sink 76 forms a negative direct current output terminal for the bridge rectifier 68. It will also be appreciated that the diodes 72 are so oriented that their cathodes respectively engage the copper disks 84 while the diodes 70 are oriented such that their anodes engage the copper disks 89.

The terminal leads 72a and 70a of the three pairs of diodes are soldered respectively to one end of the terminal studs 60, 62 and 64. Each of these terminal studs has a threaded section, for example, threaded section 62a which is utilized in a manner to be more fully described hereinafter. When the terminal studs 60, 62 and 64 have all been secured to the terminal leads 70a and 72a of the pairs of diodes the area between the heat sinks is filled with a potting compound 78 which preferably is an epoxy resin and this compound serves to electrically insulate the heat sinks 74 and 76 from each other as well as serving to aid in supporting the entire bridge rectifier assembly. During assembly the spacer blocks 80 and 82 are used to hold the heat sinks in spaced relationship.

It can be seen from an inspection of FIGS. 2, 3 and 4 that the bridge rectifier assembly 68 is disposed within the end frame 20 and is secured to the end wall 20a of the end frame 20. It can be seen from FIG. 6 that the heat sink 74 has a slot 74a whereas the heat sink 76 has a slot 76a and these slots are utilized to mount the bridge rectifier assembly to the end frame 20. To this end the slot 74a receives a terminal stud 90 which is shown in FIGS. 2 and 5. The terminal stud 90 passes through the slot 74a and through an opening 92 formed in the end wall 20a of end frame 20. The terminal stud 90 is electrically insluated from end frame 20 by an insulator 94 whereas the heat sink 74 is electrically insulated and spaced from the end frame 20 by an insulator 96. The terminal stud 90 has a threaded end portion and a nut 97 is threaded onto the stud. When this nut is tightened the heat sink 74 is fixed at one end but insulated from the end frame 20.

The slot 76a receives a screw fastener 98 shown in FIG. 3 which is not insulated from the heat sink 76 and which is threaded into a threaded opening formed in the end frame 20. The fastener 98 therefore places the end frame 20 at the same electrical potential as the anodes of the diodes 70. The end frame 20 has an axially extending boss 10 which engages the heat sink 74 over an area surrounding the threaded end of the fastener 98. The thickness of boss 100 is substantially the same as the thickness of insulator 96 to uniformly space the heat sinks 74 and 76 from the wall 20a of the end frame 20.

Referring now more particularly to FIG. 3, it can be seen that the terminal studs 60, 62 and 64 have nuts 101 threaded thereon which serve to clamp teminals 102 connected respectively with conductors 66 to the terminal studs 60, 62 and 64. In addtion, the nuts 101 when threaded onto the terminal studs serve to support a diode assembly generally designated by reference numeral 104 which may be termed a diode trio since this diode assembly contains three silicon diodes. The three diodes are designated by reference numeral 106 in FIG. 15 and the anodes of these diodes are connected respectively with conductors 109, 111 and 113. The cathodes of the diodes 106 are commonly connected to a conductor 115. The physical embodiment of what has just been described is illustrated in FIG. 3 where it is seen that the conductors 109, 111 and 113 take the form of flat metal conductors which have openings that respectively receive the terminal studs 60, 62 and 64.

The conductor 115 also takes the form of a flat metal conductor which is ultimately connected to the voltage regulator in a manner to be described. One method of fabricating the diode trio is to provide a fiat metal conductor and mount diode chips on this conductor in such a manner that the cathodes of the diodes are mounted to this conductor which is electrically connected to conductor 115 or in fact can be an extension of this conductor. The anodes of the diodes are then individually connected to conductors 109, 111 and 113 and the area containing the diode chips is then covered with an insulating material designated by reference numeral 115b. This forms a diode trio assembly which is easily and readily attached to the terminal studs 60, 62 and 64 and which is then secured in place by tightening down the nuts 101.

It will of course be appreciated by those skilled in the art that the bridge rectifier 68 and the diode trio 104 can take other forms as long as three terminal studs are provided by the bridge rectifier which can be utilized to mount the diode trio and which can also be utilized to form terminal means for electrical connection to the phase windings of the generator.

The end frame 20, in addition to containing the bridge rectifier and diode trio, also contains a semiconductor voltage regulator generally designated by reference numeral 110 which is of the transistor type and a brushholder generally designated by reference numeral 112. The brushholder assembly and the brushes it carries are illustrated in FIGS. 8 through 11 of the drawings. The brusholder assembly 112 includes a brush receiving portion 114 and a mounting portion 116 which extends radially from the brush receiving portion 114. These two portions are formed as a one-piece plastic molding and the brush receiving portion 114 is molded in such a fashion as to provide chambers 118 and 120 which respectively receive brushes 122 and 124. The brushes are urged out of the open end of the brush receiving chambers by springs 126 and 128. The brushes are retained in a retracted position prior to assembly to the generator by a rod 130 which passes through an opening in the brushholder.

The brushes 122 and 124 are connected respectively with conductors 132 and 134 and these conductors are in turn connected with terminal clips 136 and 138. The terminal clips 136 and 138 are identical and therefore only one of them will be described in detail. Thus, the terminal clip 136 includes sections 136a and 136b which are joined by a section 136c. It can be seen from FIG. 11 that the section 136b is paralulel to section 136a and the three sections have a generally U-shaped configuration. The terminal clip 136 further has an extension 136d, the purpose of which will be more fully described hereinafter. The sections 136a and 136b have aligned openings 140. The section 136a of the clip 136 receives the conductor 132 and is secured thereto by welding or other methods of connection.

In assembling the clips 136 and 138 to portion 116 of the brushholder the clips are slipped over the section 116 of the brushholder and are positioned such that the openings 140 and 142 formed respectively in the clips are aligned with openings 144 and 146 formed in the brushholder section 116. The leads 132 and 134 connected with the brushes pass through axially extending slots 114a formed in the portion 114 of the brushholder.

The brushholder portion 116 has openings 150 and 152 which are adapted to receive projections formed on the transistor voltage regulator 110 in a manner to be more fully described hereinafter. The portion 116 of the brushholder has another opening 154. A U-shaped clip 156 formed of an electrically conductive material is slipped over the end of the portion 116 and has openings 156a formed in section 156b and 156c which are aligned with opening 154. The sections 156b and 156c are joined by section 156d to form the U-shaped clip.

The clips 136, 138 and 156 are all fitted to the section 116 of the brushholder by simply slipping the U-shaped parts onto the brushholder and respectively into slots 160, 162 and 164 formed in the brushholder portion 116. These slots prevent the clips from sliding sideways and provide a locating means for the terminal clips when they are assembled to the brushholder.

The voltage regulator 110 which is mounted within the end frame 20 is illustrated in detail in FIGS. 13 and 14 of the drawings. This voltage regulator includes a plastic molding 170 which supports male terminals 172 and 174. The plastic molding 170 has a rectangular opening 176 which is closed at one end by a metal heat sink 178. The metal heat sink 178 carries a ceramic substrate 180 which in turn carries the transistors and other electrical components forming the voltage regulator. These are preferably formed as in integrated circuit and the output transistor of the voltage regulator which is designated by reference numeral 182 is supported on a metal heat sink 184 which in turn is supported by the metal heat sink 178. The ceramic substrate carries the other components of the voltage regulator which are to be described.

The plastic housing 170 carries terminals 190, 192 and 194 formed of electrically conductive material. These terminals respectively have face-mounted annular sections 190a, 192a and 194a. The terminals that have just been described are electrically connected with the integrated voltage regulator in a manner to be described in connection with the circuit diagram of FIG. 15. It can be seen from FIG. 13 that the terminal 190 is electrically connected with male terminal 172 via a conductor 196, a part of which is molded into the plastic housing 170. The male terminal 174 is connected into the integrated circuit by a conductor 198 whereas terminals 192 and 194 are respectively connected into the integrated circuit by conductors 202 and 200.

The area containing the ceramic substrate 180 and the metal part 184 in the final assembly of the voltage regulator is closed by a plastic cover 203. This plastic cover 203 and the metal heat sink 178 are fixed to the housing 170 by a plurality of rivets 204. The cover 203 has axially extending bosses 206 which fit in the openings 150 and 152 of the brushholder in the final assembly of the brushholder and regulator in the generator.

It will be appreciated from an inspection of FIG. 12 that the annular terminals 190a, 192a and 194a are exposed and will be forced into engagement with certain of the terminals on the brushholder during final assembly of the brushholder and voltage regulator to the generator.

The assembly of the transistor voltage regulator 110 and the brushholder 112 to the end wall 20a of the end frame 20 will now be described. In assembling these components to the end frame 20 the voltage regulator is placed against the inner wall 20a of the end frame in such a position that the openings 191, 193 and 195 of the voltage regulator are respectively aligned with threaded openings 210, 212 and 214 formed in the end wall 20a of the end frame 20. In positioning the voltage regulator the metal heat sink 178 faces and engages the end frame 20 as is illustrated in FIG. 4. The brushholder assembly is now positioned such that the section 116 of the brushholder overlies the voltage regulator with the wall 116a facing the voltage regulator. The brushholder is positioned such that the openings 150 and 152 respectively receive the axially extending bosses 206 of the voltage regulator. With this positioning of the voltage regulator and the brushholder one side 156c of terminal 156 of the brushholder will directly engage the terminal face 194a of the transistor voltage regulator. One side of the terminal 138 will engage the terminal face 192a of the voltage regulator and one side of terminal 136 will directly engage the terminal 190a of the voltage regulator.

When the brushholder 112 is properly positioned the rod 130, which holds the brushes retracted, will project through opening 20c formed in end frame 20. The rod 130 is pulled out through opening 20c to allow the brushes to engage the slip rings after the brushholder and regulator are fixed to the end frame and after the rotor is fitted to the end frame.

With the parts positioned in a manner just described three threaded fasteners are passed through the aligned brushholder and voltage regulator openings and are threaded into the end frame 20. The three fasteners are identical and one of them, which is designated by reference numeral 220, is illustrated in FIG. 4. The screw 220 carries a sleeve of insulating material 222 which is preferably a heat shrinkable plastic material which has a shrink fit on the screw. The terminal screw 220 passes through an opening in conductor 115 of the diode trio 104 and is insulated from this conductor by an insulator 224. It can be seen from the foregoing that the screw 220 is electrically insulated from the terminals carried by the voltage regulator and the brushholder but serves to support both the brushholder and the transistor voltage regulator as well as holding the terminal strip 115 in tight engagement with the terminal clip 136 of the brushholder.

The two other screws which pass through the openings in the brushholder and transistor voltage regulator which serve to secure these parts to the end frame 20 are shown in FIG. 3 and designated by reference numerals 230 and 232. The terminal screw 230 is the same as screw 220 in that it carries a sleeve of insulating material which insulates it from the terminals of the voltage regulator and brushholder. An insulating washer 234, which is the same as the insulating washer 224, insulates the head of the terminal screw 230 from the terminal clip 138. The screw 230 forces one side of the terminal clip 138 into tight engagement with the annular section 192a of the voltage regulator.

The terminal screw 232 passes through openings in the voltage regulator and brushholder but no insulating washer is used with this screw because in this case the terminal screw 232 electrically connects the end frame 20 and the terminal clip 156 of the brushholder. This terminal screw is provided with an insulating sleeve such as sleeve 222 on terminal screw 220 but the head of the screw engages a metal washer which in turn electrically connects the head of the screw to the terminal clip 156. If desired the screw 232 need not have an insulating sleeve.

It will be appreciated from the foregoing that the terminal screws 220, 230 and 232 serve to positively secure the voltage regulator 110 and the brushholder 112 to the end frame 20 and also provide tight electrical contact between the terminal clips carried by the brushholder and the annular terminal parts carried by the transistor voltage regulator.

Referring now to FIG. 15, the schematic circuit diagram of the diode-rectified alternating current generator will now be described. In FIG. 15 the same reference numerals have been used as were used in the other figures of the drawing where applicable to identify the same components.

In FIG. 15 the three phase Y-connected stator winding 28 is connected with the terminal studs 60, 62 and 64 and these studs are connected with the diodes 70 and 72 as set forth previously in describing the diode bridge illustrated in FIGS. 6 and 7. The heat sink 74, which is the positive direct current output terminal of the bridge rectifier, is electrically connected with the terminal stud 90 and it is so designated in FIG. 15.

When using the generator of this invention the terminal stud 90 is connected with a cable conductor 250 and this cable conductor is connected to the positive side of a battery 252. The opposite side of the battery is grounded as shown and when the generator is in operation and being driven by the internal combustion engine of a motor vehicle the generator supplies charging current to the battery. In addition, various electrical loads such as headlamps, radio and so forth are connected between conductor 250 and ground through suitable switches not shown.

The transistor voltage regulator 110 can take various forms and one type of regulator is illustrated in FIG. 15. This regulator has an NPN output transistor 182 having its emitter connected to conductor 256 which is grounded. The conductor 256 corresponds to the terminal 194 of the transistor voltage regulator which is grounded by terminal screw 232 when the voltage regulator is assembled to the end frame. The transistor 182 is mounted on the metal heat sink 184 as is illustrated in FIG. 13.

The transistor regulator further includes NPN transistors 258 and 260 connected in a Darlington configuration with their collectors connected to conductor 262. The emitter of transistor 260 is connected to the base of transistor 258 and the emitter of transistor 258 is connected to grounded conductor 256. A silicon diode 264 is connected between the collectors of transistors 258 and 260 and the base of transistor 182. A voltage divider comprised of resistors 266 and 268 is connected between terminal 174 and grounded conductor 256. A Zener diode 270 is connected between a junction of the voltage divider resistors and the base of transistor 260.

The junction or terminal 174 is illustrated schematically in FIG. 15 and physically in FIGS. 12 through 14. This junction takes the form of a male terminal which is electrically connected to the cable 250 at a junction 272 when the generator is connected with a motor vehicle electrical system.

The transistor voltage regulator has another junction designated by reference numeral 172 which in the physical embodiment takes the form of a male terminal 172 illustrated in FIGS. 12 through 14. The junction 172 is connected with a resistor 274 and with conductor 276. A field discharge diode 278 is connected between the collector of transistor 182 and the conductor 276.

The junction 172 is connected with the electrical system such that it is connected to one side of a resistor 280 and a signal lamp 282. The resistor 280 is connected in series with a manually operable switch 284, the opposite side of the switch being connected to conductor 250. The signal lamp 282 is connected in series with another manually operable switch 286 which is likewise connected to conductor 250. The switch 286 can be an ignition switch for a motor vehicle and the switch 284 an accessory switch as is described in the U.S. patent to Donald E. Colvill 3,244,900.

In FIG. 15 the slip rings which are connected with field winding 48 have been designated by the same reference numerals utilized in FIG. 2. The brushes have likewise been designated by the same reference numerals used in describing the physical embodiment of the invention. It is pointed out that the junctions 136 and 138 illustrated in FIG. 15 correspond to terminals 136 and 138 of the brushholder and that the connection into the voltage regulator is made when these terminals 136 and 138 respectively engage the terminal faces 190a and 192a of the voltage regulator. As pointed out previously, the components of the transistor voltage regulator with the exception of the output transistor 182 are mounted on the ceramic substrate 180. It should also be pointed out that in order to make the electrical connections to male terminals 172 and 174 it is only necessary to connect these terminals with a suitable female receptacle having two wires one of which is electically connected to junction 272 and the other of which is connected to the one side of resistor 280 and signal lamp 282. In this regard it is seen (FIG. 1) that terminals 172 and 174 are accessible through an opening 20b formed in end frame 20. It will therefore be appreciated that in order to place the generator of this invention in operation it is only necessary to make electrical connections to the male terminals 172 and 174 and to make an electrical connection to the terminal stud 90. The ground connection for the generator is made when the generator housing is mounted to some metal part of the motor vehicle.

The transistor voltage regulator operates to maintain a desired regulated voltage from the generator when it is used in a motor vehicle electrical system. For example, in a 12 volt electrical system the transistor voltage regulator will regulate the output voltage of the generator so that approximately 14 volts appears between junction 272 and ground.

When the driver of a motor vehicle starts the engine the switches 284 and 286 are closed and the field 48 will be initially energized from the battery 252. This circuit can be traced from the positive side of the battery through closed switches 284 and 286, through resistor 280 and signal lamp 282, through junction 172, through conductor 276, through field winding 48 and then through the collector-emitter circuit of transistor 182 which at this time is biased conductive. This current path of course is through the slip rings and brushes and through the terminals of the voltage regulator and brush-holder.

When the generator is now driven by the engine its output voltage increases and when this output voltage reaches a desired regulated value, the Zener diode and the base-emitter junction of transistors 260 and 258 break down causing the transistors 260 and 258 to be biased to a conductive condition. When this happens the voltage of conductor 262 decreases due to the voltage drop across resistor 274. The voltage applied between conductor 172 and ground is a voltage provided by the diodes 106 and the diodes 70 which form a second three phase full-wave bridge rectifier. When the voltage at conductor 262 decreases to a point where it will not break down the voltage required to forward bias diode 264 and the base-emitter junction of transistor 182 the transistor 182 is biased nonconductive. When the transistor 182 switches off field current is reduced with a consequent reduction in output voltage of the generator.

When the output voltage of the generator drops to a predetermined value, the Zener diode 270 and the base-emitter circuits of transistors 260 and 258 resume a blocking condition with the result that the two transistors are biased nonconductive. The voltage of conductor 262 now increases sufficiently to forward bias transistor 182 and this transistor now becomes conductive. From the foregoing it can be seen that the output transistor 182 is continuously switched on and off to turn field current on and off and therefore providing a desired regulated output voltage for the generator.

As pointed out above, the diodes 106 and the diodes 70 of the main bridge rectifier supply current to the voltage regulator and supply current to the field winding 48. This means that when the generator is shut down and when switches 284 and 286 are open there is no discharge path through the field winding 48 of the generator from the battery 252. The resistors 266 and 268 remain permanently connected across the battery 252 but their resistance value is sufficiently high to prevent any substantial drain on the battery when the generator is not being used.

The diodes 106, in addition to providing a field disconnect device, also operate to control the energization of signal lamp 282. Thus, when the generator is developing the desired regulated output voltage the voltage of junction 172 is substantially equal to the voltage of conductor 250 with the result that the signal lamp 282 is extinguished indicating that the generator is developing its proper output voltage. Should a malfunction occur in the system which would reduce the potential of junction 172 the signal lamp would be energized sufficiently to indicate a malfunction. The signal lamp of course is energized whenever the field 48 of the generator is initially energized from battery 252 when the engine of the vehicle is being started.

The voltage regulator 110, as previously pointed out, can take a wide variety of forms and may be of the type shown in copending U.S. patent application S.N. 668,794, filed on Sept. 19, 1967, and assigned to the assignee of this invention.

Referring now to FIG. 2, the shaft 36 is connected with a pulley 290 and a fan 292. When using the generator of this invention the pulley is connected with a V-belt driven by the engine of the motor vehicle and when the fan rotates it pulls air through the generator. The air will enter the generator through air inlet openings 294 formed in the end frame 20. Air will also enter the generator through spaced openings 296 located circumferentially about the end frame 20. In addition, air can enter the generator through air inlet openings 298 which are disposed about a section 300 of the end frame which has axially extending heat dissipating ribs 302. The air inlet openings 294 are aligned with the bridge rectifier assembly 83 whereas the inlet openings 298 are aligned with the outer periphery of the transistor voltage regulator 110.

Air passing through the generator will exit through air outlet openings 304 formed in the end frame 22. Although only one air outlet opening has been illustrated in the sectional view of FIG. 2, the end frame 22 preferably has a plurality of air outlet openings and may, for example, have six equally spaced air outlet openings. It therefore will be appreciated that the bridge rectifier and the transistor voltage regulator as well as the stator winding of the generator are cooled by pulling air through the generator when the engine of the motor vehicle drives the pulley and fan.

It will be appreciated that heat generated by the components of the voltage regulator is transferred to section 300 of the end frame 20 through regulator heat sink 178 which directly contacts the inner wall of section 300.

The tab extension on terminal 138 like extension 136d is aligned with opening 20d formed in end frame 20 when brushholder 112 is assembled to the end frame. This allows a metal tool to contact terminals 138 by passing it through opening 20d. This permits the grounding of field winding 48 by touching the tab extension of terminal 138 and the end frame 20 by a metal tool where it is desired to test the continuity of the field 38 without going through the voltage regulator.

A capacitor 310 is connected between direct current output terminal 74 and ground. This is accomplished by connecting the capacitor lead 312 to heat sink 74 (see FIG. 3) by a screw 314 threaded into the heat sink. The outer metal part of the capacitor 310 is grounded by supporting clip 316 fixed to end frame 20 by screw 318.

From an inspection of FIG. 8, it is clear that the width of brush holding portion 116 between walls 116a and 116b is less than the width of brush holding portion 114 taken between walls 114b and 114c. The thickness of the voltage regulator between heat sink 178 and cover 203 is slightly larger than the distance between wall 116a and wall 114b when the voltage regulator and brushholder are mounted to the end frame. This means that the voltage regulator and brushholder will occupy a minimum amount of axial space within end frame 20 which is approximately equal to the distance between walls 114b and 114c and less than a distance equal to the distance between walls 114b and 114c added to the thickness dimension of the voltage regulator.

What is claimed is:

1. A direct current power supply unit comprising, an alternating current generator having a housing, said housing being formed at least in part by an end frame, an output winding supported by said housing, a rotor supported for rotation by said housing carrying a field coil, slip rings rotatable with said rotor and electrically connected with opposite ends of said field coil, rectifier means located within and supported by said housing electrically connected with said output winding for supplying direct current to an electrical load, a brushholder formed of insulating material, a voltage regulator including a housing formed of insulating material containing a semiconductor voltage regulating means, aligned openings in said brushholder and voltage regulator, a pair of brushes supported by said brushholder engaging said slip rings, first and second terminal means electrically connected respectively with said brushes, said terminal means fitted to said brushholder and having openings aligned with said openings in said brushholder and voltage regulator, said voltage regulator and said brushholder positioned in a stacked relationship within said end frame with said regulator engaging an inner wall of said end frame and with said brushholder engaging said regulator, at least a portion of said first and second terminal means disposed between said brushholder and voltage regulator and directly engaging respectively a plurality of conductive means carried by said voltage regulator, and fastener means passing through said openings formed in said terminal means, brushholder and voltage regulator securing said voltage regulator and brushholder to said end frame, said fastener means when tightened operating to force the conductive means of said voltage regulator into tight engagement with said first and second terminal means carried by said brushholder whereby the engagement of said terminal means of said brushholder with said conductive means of said voltage regulator electrically connects said field coil and said semiconductor voltage regulating means of said voltage regulator.

2. A voltage regulated direct current power supply unit comprising, an alternating current generator having housing means provided at least in part by an end frame, a polyphase stator winding supported by said housing means, a rotor rotatable with respect to said stator winding carrying a field coil, first and second slip rings rotatable with said rotor electrically connected to opposite ends of said field coil, a power bridge rectifier unit supported by said housing means electrically connected with said stator winding, said bridge rectifier unit having direct current output terminals for feeding a direct current load, a semiconductor voltage regulator, a brushholder, a plurality of openings in said brushholder, a plurality of openings in said voltage regulator, electrically conductive means disposed about the openings in said voltage regulator located on the exterior of said voltage regulator, first and second brushes carried by said brushholder, first and second terminal clips electrically connected respectively with said brushes supported by said brushholder, said terminal clips each having at least one opening aligned with said openings in said brushholder, said voltage regulator and brushholder being positioned within said end frame such that said voltage regulator engages an inner wall of said end frame and said brushholder engages said voltage regulator, said brushholder and voltage regulator being so oriented that the conductive means on said voltage regulator engages the terminal clips of said brushholder with the openings in said brushholder and voltage regulator aligned, and fastener means passing through the aligned openings in said brushholder and voltage regulator and threaded into the end frame of said generator, said fastener means serving to secure said voltage regulator and brushholder in a stacked relationship to said end frame of said generator and operating to force the conductive means of said voltage regulator into tight engagement with the terminal clips of said brushholder.

3. A direct current power supply unit comprising, housing means defined at least in part by an end frame, a stator assembly including an output winding supported by said housing means, a rotor rotatably supported by said housing means rotatable with respect to said stator assembly and carrying a field coil, first and second slip rings rotatable with said rotor and electrically connected with said field coil, rectifier means connected with said output winding having direct current output terminals adapted to be connected with an electrical load, a brushholder, a transistor voltage regulator, said voltage regulator having a housing formed of insulating material carrying a plurality of electrical conductors, said regulator housing enclosing at least one transistor, first and second brushes carried by said brushholder engaging said slip rings, first and second terminal clips each having an opening removably supported by said brushholder electrically connected respectively with said brushes, said transistor voltage regulator located in engagement with an inner wall of said end frame and said brushholder engaging one side of said voltage regulator opposite said end wall and projecting toward said rotor, said voltage regulator and brushholder being positioned such that said electrical conductors of said voltage regulator directly engage respectively said first and second terminal clips carried by said brushholder, and a plurality of fastener means passing through aligned openings formed in said brushholder, terminal clips and voltage regulator and threaded into threaded openings in said end frame, said fastener means operating to support said brushholder and voltage regulator from said end frame and operating to hold said terminal clips in tight engagement with said electrical conductors carried by said voltage regulator.

4. A diode-rectified alternating current generator having a self-contained transistor voltage regulator comprising, a housing means formed at least in part by an end frame, a stator assembly including a polyphase stator winding supported by said housing means, a rotor rotatably supported by said housing means carrying a field coil electrically connected with first and second slip rings rotatable with said rotor, a unitary polyphase bridge rectifier assembly supported by said end frame and disposed adjacent the shaft of said rotor, said bridge rectifier assembly comprising first and second heat sinks which are electrically insulated from each other, each of said heat sinks carrying a plurality of diodes electrically connected with said heat sinks in such a manner that the anodes of one group of diodes are connected to one of said heat sinks whereas the cathodes of the other group of diodes are connected to the other heat sink, a plurality of projecting terminal means carried by said bridge rectifier assembly and electrically connected with pairs of diodes, said projecting terminal means forming AC input terminals for said bridge rectifier unit, a second rectifier unit having a plurality of input terminals equal in number to the terminal means of said bridge rectifier assembly and an output terminal, said input terminals having openings receiving said terminal means of said bridge rectifier assembly, a plurality of first terminal means connected to said projecting terminal means electrically connected with the phase windings of said stator winding, means engageable with said first terminal studs for fixing said means connecting said input terminals of said second rectifier unit to said projecting terminal means of said bridge rectifier unit, a brushholder, a voltage regulator, said brushholder carrying brushes engageable with said slip rings of said rotor, second terminal means carried by said brushholder electrically connected respectively with said brushes, said voltage regulator having exposed conductive means directly engaging said second terminal means carried by said brushholder, and fastener means for securing said voltage regulator and brushholder to an inner wall of said end frame and for holding said second terminal means of said brushholder in tight engagement with said conductive means of said voltage regulator, one of said fastener means operating to hold said output terminal of said second rectifier unit in tight engagement with one of the second terminal means carried by said brushholder.

5. A diode-rectified alternating current generator comprising, housing means defined at least in part by an end frame, a polyphase stator winding supported by said end frame, a rotor assembly rotatable with respect to said housing means and stator winding for causing an alternating current to be generated in said stator winding when said rotor means is driven, a single unit bridge rectifier supported from an inner wall of said end frame, said bridge rectifier unit having first and second metal heat sinks which are electrically insulated from each other, a plurality of diodes supported by said first heat sink, a plurality of diodes supported by said second heat sink, said first diodes having their anodes electrically connected to said first heat sink and said second diodes having their cathodes connected to said second heat sink, a plurality of terminal studs supported by said bridge rectifier unit and electrically connected with pairs of diodes supported respectively by each heat sink, a terminal stud engaging one of said heat sinks and passing through an opening in said end frame to form one direct current output terminal for said generator, means electrically insulating said terminal stud from said end frame, an insulator for spacing and electrically insulating one wall of one of said heat sinks from an inner wall of said end frame, a fastener means engaging the other heat sink threaded into said end frame, said other heat sink directly engaging a boss extending axially from an inner wall of said end frame which serves to space said bridge rectifier unit from said inner wall of said end frame, said end frame having the same electrical potential as said other heat sink, and said insulator and boss serving to space and insulate said heat sink unit from said end frame.

6. In combination, an alternating current generator having a housing means formed at least in part by an end frame, an output winding supported by said housing means, a rotor rotatably supported by said housing means carrying a field coil, slip rings rotatable with said rotor electrically connected with said field coil, a voltage regulator unit for regulating the output voltage of said generator located in engagement with an inner wall of said end frame, one wall of said voltage regulator unit which faces the interior of said generator having electrically conductive means which are electrically connected internally with components of said voltage regulator, a brushholder formed of insulating material having a mounting portion and a brush holding portion, said mounting portion extending axially from said brush holding portion, first and second brushes carried by said brush holding portion engaging said slip rings, first and second brush conductors connected respectively with said brushes and located at least partially at first and second opposite sides of said mounting portion of said brushholder, first and second removable terminal clips carried by said mounting portion of said brushholder, said first terminal clip electrically connected to said first brush conductor on said first side of said mounting portion and said second terminal clip electrically connected with said second brush conductor on said second side of said mounting portion, said second terminal clip extending from said second side of said mounting portion to said first side of said mounting portion and having a conductive face positioned on said first side of said mounting portion, said first terminal clip and said conductive face of said second terminal clip directly engaging said conductive means of said transistor voltage regulator, and fastener means passing through said mounting portion of said brushholder and through said voltage regulator and threaded into said end frame for securing said brushholder and voltage regulator in a stacked relationship to said end frame, said fastener means maintaining tight electrical contact between the conductive means of said voltage regulator and the terminal clips of said brushholder.

7. A diode-rectified alternating current generator having a self-contained semiconductor voltage regulator comprising, housing means formed at least in part by an end frame, an output winding for said generator supported by said housing means, a rotor rotatably supported by said housing means carrying slip rings and a field coil, said field coil electrically connected with said slip rings, rectifier means located within said housing means for converting alternating current generated in said output winding to direct current, a semi-conductor voltage regulator located within said end frame having a housing formed of insulating material, said semiconductor voltage regulator having an internal semiconductor switching device for controlling current flow through said field coil of said generator, said voltage regulator further including means for controlling the conduction of said semiconductor switching device, a plurality of openings formed in said voltage regulator, annular conductor means disposed about said openings and electrically connected with components of said voltage regulator, one of said annular conductive means being connected internally with said semiconductor switching device, a brushholder formed of insulating material having brushes which are engageable with said slip rings, said brushholder engaging the housing of said voltage regulator and having openings aligned with said openings in said voltage regulator, terminal clips carrier by said brushholder electrically connected respectively with said brushes and having openings aligned with the openings in said brushholder and voltage regulator, and fastener means passing through said openings in said brushholder, terminal clips and voltage regulator for securing said brushholder and voltage regulator to an inner wall of said end frame, said fastener means forcing areas of said terminal clips into tight engagement with said annular conductive means of said voltage regulator to thereby electrically connect said field coil and the internal components of said voltage regulator.

8. The diode-rectified alternating current generator according to claim 7 where terminal clips are U-shaped and fit onto a portion of said brushholder, said terminal clips being removable for replacement of said brushes.

9. A diode-rectified alternating current generator having a self-contained transistor voltage regulator comprising, housing means formed at least in part by an end frame, a polyphase output winding supported by said housing means, a rotor rotatably supported by said housing means carrying a field coil, slip rings rotatable with said rotor electrically connected with said field coil, a bridge rectifier unit including a pair of heat sinks carrying groups of diodes supported from an inner wall of said end frame, said bridge rectifier unit having AC input terminals electrically connected with said output winding and direct current output terminals, a transistor voltage regulator having a housing formed at least in part of insulating material, said housing containing a voltage sensing circuit and an output transistor electrically connected with said voltage sensing circuit, a voltage sensing terminal connected with said voltage sensing circuit and extending axially through a first wall of said voltage regulator housing, a first conductive means supported by a second wall of said voltage regulator housing electrically connected with said output transistor, a second conductive means carried by said second wall of said voltage regulator housing electrically connected with internal components of said transistor voltage regulator, a brushholder carrying brushes which are engageable with said slip rings, terminal clips carried by said brushholder electrically connected with said brushes, said voltage regulator positioned such that a third wall of said voltage regulator housing engages an inner wall of said end frame, said brushholder positioned such that it engages said second wall of said voltage regulator housing, fastener means passing through openings in said voltage regulator and brushholder and threaded into said end frame for securing said brushholder and voltage regulator to said end frame, said terminal clips on said brushholder directly engaging said conductive means located on said second wall of said voltage regulator housing, and an opening in said end frame, said voltage sensing terminal extending from said first wall of said voltage regulator housing aligned with said opening whereby said voltage sensing terminal can be electrically connected externally with the electrical system of a motor vehicle.

10. The diode-rectified alternating current generator according to claim 9 where the second wall of said voltage regulator housing has a third conductive means and where a fastener for securing the voltage regulator to the end frame electrically connects said third conductive means to the end frame whereby said third conductive means is at the same electrical potential as said end frame, said third conductive means being electrically connected with said output transistor.

11. A diode-rectified alternating current generator comprising, housing means formed at least in part by an end frame, an output winding for said generator supported by said housing means, a rotor rotatably supported by said housing means carrying slip rings and a field coil, said field coil electrically connected with said slip rings, rectifier means located within said housing means for converting alternating current generated in said output winding to direct current, a voltage regulator, a brushholder having a brush holding portion and a mounting portion, said mounting portion extending from said brush holding portion in a direction substantially parallel to the end wall of said end frame, brushes carried by said brush holding portion of said brushholder engaging said slip rings, terminal clips electrically connected with said brushes fitted to said mounting portion of said brushholder, conductive means on said voltage regulator, said voltage regulator and brushholder being mounted in a stacked relationship within said end frame with said voltage regulator aligned with the mounting portion of said brushholder and with said terminal clips engaging said conductive means on said voltage regulator, and fastener means securing said brushholder and voltage regulator to said end frame, said mounting portion of said brushholder having a width which is less than the width of said brush holding portion in a direction axial of said generator whereby the space taken up by said brushholder and voltage regulator axially within said generator is less than the combined widths of said voltage regulator and brush holding portion of said brushholder.

12. A diode rectified alternating current generator comprising, housing means defined at least in part by a metallic end frame, an output winding for said generator, a rotor rotatable with respect to said output winding carrying a field coil connected with slip rings, a brush-holder located within said housing means supporting brushes engageable with said slip rings, a voltage regulator located within and supported by said housing means, said voltage regulator having a housing containing a field current control means, said voltage regulator housing carrying first and second conductive means, said second conductive means connected to one side of said field current control means, means connecting said brushes respectively with said first and second conductive means, rectifier means located within said housing means connected to said output winding, one direct current output terminal of said rectifier means connected to said first conductive means, means connecting the other direct current output terminal of said rectifier means with said metallic end frame, means connecting the other side of said field current control means with said metallic end frame, an opening in said metallic end frame, and a terminal means located within said housing means electrically connected to said second conductive means and aligned with said opening, said opening adapted to receive a conductive shorting means engageable with said terminal means and said metallic end frame to bypass said field current control means when said end frame and terminal means are connected by said shorting means.

References Cited
UNITED STATES PATENTS

| | | | |
|---|---|---|---|
| 3,022,456 | 2/1962 | Larson | 322—99 |
| 3,041,484 | 7/1962 | Freer | 310—68 |
| 3,107,323 | 10/1963 | Plante | 322—99 |
| 3,198,972 | 8/1965 | Larson | 310—68 |
| 3,253,167 | 5/1966 | Bates | 310—68 |
| 3,329,841 | 7/1967 | Binder | 310—68 |
| 3,336,519 | 8/1967 | Grimm | 322—99 |
| 3,339,096 | 8/1967 | Heiny | 310—239 |
| 3,361,915 | 1/1968 | Baker | 310—68 |

MILTON O. HIRSHFIELD, Primary Examiner

R. SKUDY, Assistant Examiner

U.S. Cl. X.R.

310—71, 89, 171, 239